(12) United States Patent
Chikamatsu

(10) Patent No.: US 8,167,101 B2
(45) Date of Patent: May 1, 2012

(54) DAMPING FORCE GENERATING MECHANISM FOR SHOCK ABSORBER

(75) Inventor: Satoshi Chikamatsu, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 901 days.

(21) Appl. No.: 12/230,860

(22) Filed: Sep. 5, 2008

(65) Prior Publication Data
US 2009/0065315 A1 Mar. 12, 2009

(30) Foreign Application Priority Data
Sep. 6, 2007 (JP) ................................. 2007-231470

(51) Int. Cl.
F16F 9/34 (2006.01)
(52) U.S. Cl. ..................... 188/313; 188/281; 188/282.1; 188/282.8; 188/284; 188/287; 188/316; 188/322.15
(58) Field of Classification Search .................. 188/313, 188/316, 317, 319.1, 319.2, 322.15, 322.13, 188/322.22, 275, 280, 282, 282.5, 283, 299; 92/109, 143, 181 P, 422
See application file for complete search history.

(56) References Cited

U.S. PATENT DOCUMENTS

| | | | | |
|---|---|---|---|---|
| 5,234,085 A | * | 8/1993 | Schneider | 188/282.8 |
| 6,352,145 B1 | * | 3/2002 | DeMolina et al. | 188/281 |
| 6,776,269 B1 | * | 8/2004 | Schel | 188/287 |
| 2006/0086581 A1 | * | 4/2006 | Vanbrabant | 188/281 |

FOREIGN PATENT DOCUMENTS

JP 09-291961 11/1997

* cited by examiner

*Primary Examiner* — Robert A Siconolfi
*Assistant Examiner* — San Aung
(74) *Attorney, Agent, or Firm* — Rabin & Berdo, P.C.

(57) ABSTRACT

A shock absorber comprises a first passage (2a, 2b) and a second passage (15) connecting a first fluid chamber (41) and a second fluid chamber (42). A throttle (12, 14) narrows an inflow of fluid to the first passage (2a, 2b) according to an applied displacement pressure. The displacement pressure includes a fluid pressure in one of the two fluid chambers (41, 42) and a pressure that depends on a velocity of the fluid flow through the throttle (12, 14). A spring (25, 29) biases the throttle (12, 14) in the opposite direction to narrow the fluid flow. The second passage (15) comprises a pair of orifices (16a, 17a). By exerting a pressure between the pair of orifices (16a, 17a) on the throttle (12, 14) in the opposite direction to narrow the fluid flow, the spring load required of the spring (25, 29) is reduced.

10 Claims, 4 Drawing Sheets

DAMPING FORCE GENERATING MECHANISM FOR SHOCK ABSORBER

FIELD OF THE INVENTION

This invention relates to a damping force generating mechanism provided in a shock absorber.

BACKGROUND OF THE INVENTION

A hydraulic shock absorber for a vehicle comprises, for example, two fluid chambers separated in the interior of a cylinder by a piston, and a passage provided through the piston to connect these fluid chambers. A damping valve in the form of a leaf valve is provided at an outlet of the passage to generate a damping force relative to the displacement of the piston. The leaf valve generally comprises a plurality of stacked leaves having a fixed inner circumferential part, and lifts an outer circumferential part to open the passage according to a differential pressure between the upstream and downstream sides of the leaves. With this construction, however, the damping force generated by the leaf valve tends to be excessive in a medium-speed to a high-speed region of piston displacement.

To improve the damping force characteristic of a leaf valve for a damping valve, JPH09-291961A, published by the Japan Patent Office in 1997, proposes a leaf valve in which the inner circumferential part is not fixed but supported resiliently by a coil spring.

Figure 3:
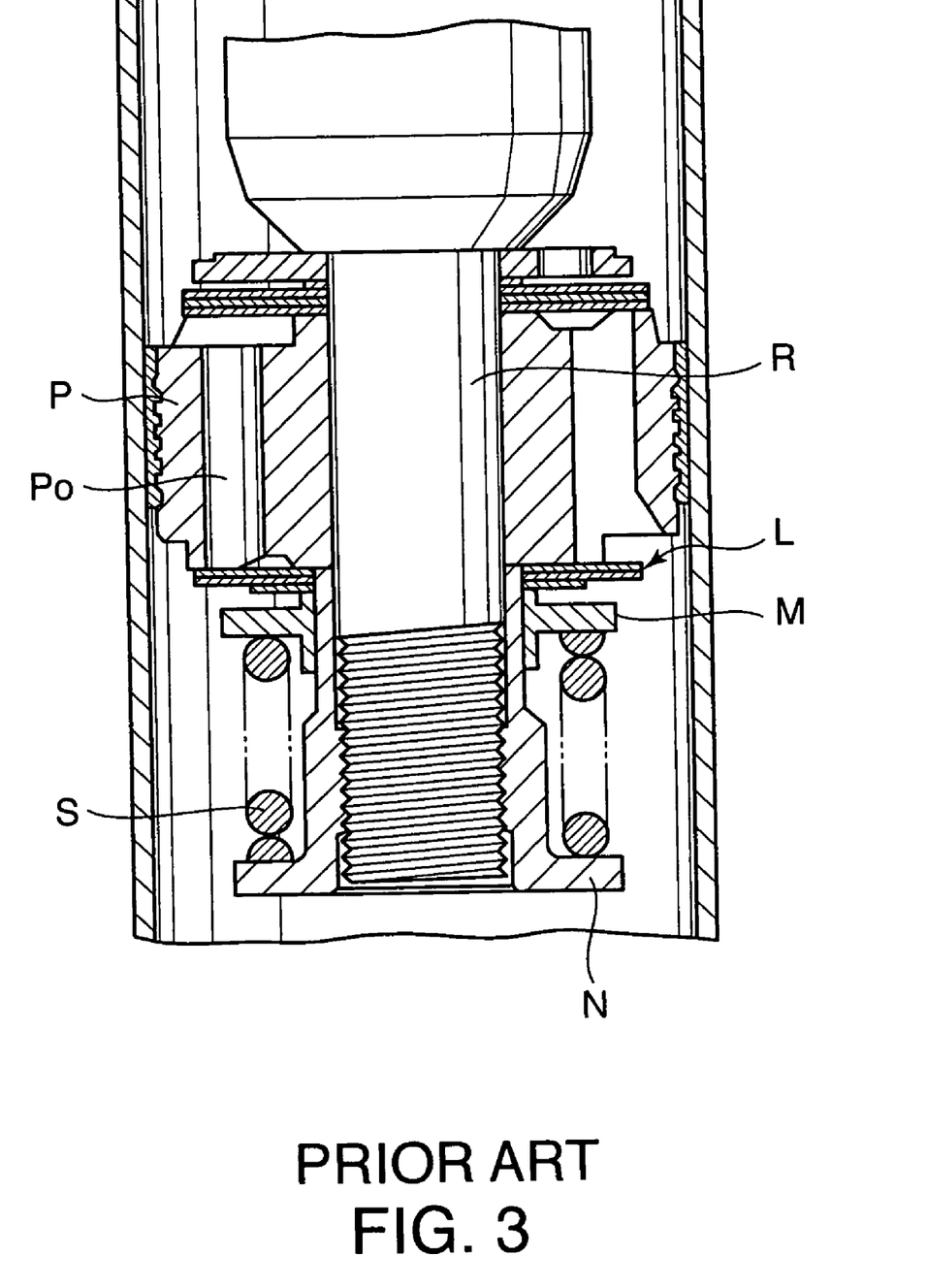
FIG. 3 is a longitudinal sectional view of essential parts of a hydraulic shock absorber including a damping force generating mechanism according to the prior art.

Referring to FIG. 3, in a shock absorber in which this leaf valve is installed, a cylindrical piston nut N is secured onto a tip of a piston rod R penetrating the piston P. A leaf valve L closing an outlet of a passage Po which passes through the piston P is fitted to the outer circumference of the piston nut N such that it can displace in an axial direction. A coil spring S, an end of which is supported by the piston nut N, resiliently supports the inner circumferential part of the leaf valve L via a push member M.

Figure 4:
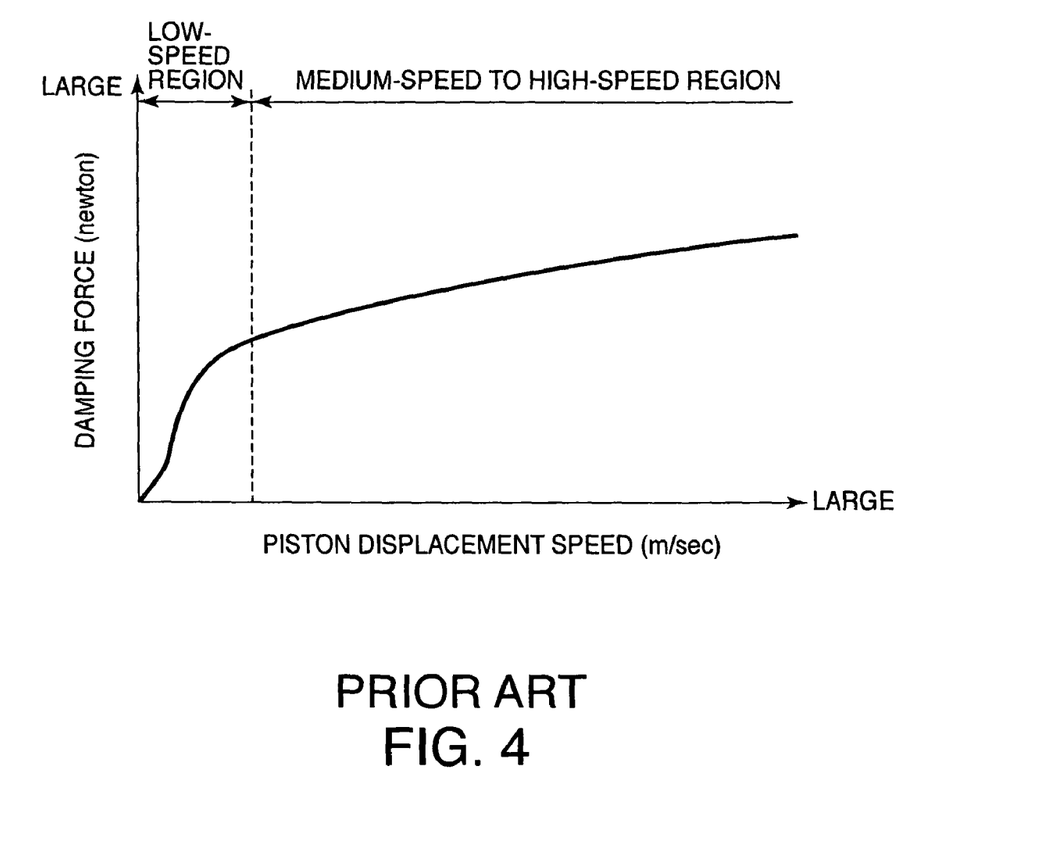
FIG. 4 is a diagram showing the characteristic of a damping force generated by the damping force generating mechanism according to the prior art.

When the piston P moves upward in the figure, working oil in an oil chamber above the piston P flows into an oil chamber below the piston P via the passage Po and a damping force is generated due to the flow resistance of the leaf valve L at the outlet of the passage Po. When the piston displacement speed is in a low-speed region, the outer circumferential part of the leaf valve L is bent downward in the figure from the inner circumferential part supported by the push member M. As the piston displacement speed reaches the medium-speed to high-speed region, the pressure in the passage Po becomes greater than the resilient force of a coil spring S such that the leaf valve L retreats from the piston P downward in an axial direction together with the push member M. As a result, the opening area of the leaf valve L becomes large, thereby preventing the damping force from becoming excessive. As shown in FIG. 4, the damping force increase is gradual with respect to an increase in the piston displacement speed, in the medium-speed to high-speed region.

The prior art therefore prevents a damping force from becoming excessively large in the medium-speed to high-speed region of the piston displacement, thereby increasing the riding comfort of the vehicle.

SUMMARY OF THE INVENTION

This valve structure is effective in suppressing an excessive increase in the damping force generated in the medium-speed to high-speed region of piston displacement. Since the leaf valve L is kept in a retreated position once the piston displacement speed has reached the medium-speed to high-speed region of piston displacement, the damping force characteristic does not vary as long as the piston displacement speed varies in this region. When a spring load is set to obtain a preferable damping force in the medium-speed region, therefore, the damping force generated in the high-speed region may become insufficient.

It is therefore an object of this invention to provide a damping force generating mechanism which realizes different damping force characteristics in the middle-speed region and the high-speed region of piston displacement such that a preferable damping force is obtained in each of the speed regions.

To achieve the above object, this invention provides a damping force generating mechanism for such a shock absorber that comprises a first fluid chamber, a second fluid chamber, and a first passage which allows a fluid flow between the first fluid chamber and the second fluid chamber. The damping force generating mechanism comprises a damping valve which generates a damping force against a fluid to flow through the first passage, a throttle which narrows an inflow to the first passage according to an applied displacement pressure, a biasing member which biases the throttle in the opposite direction to narrow the inflow to the first passage, a second passage which connects the first fluid chamber and the second fluid chamber via a pair of orifices, and a pressure chamber which exerts a pressure in the second passage between the pair of orifices on the throttle in the opposite direction to narrow the inflow to the first passage.

The displacement pressure includes a pressure in one of the fluid chambers which biases the throttle in a direction to narrow the inflow to the first passage and a pressure that acts on the throttle in an opposite direction to narrow the inflow to the first passage depending on a velocity of the fluid flow through the throttle.

The details as well as other features and advantages of this invention are set forth in the remainder of the specification and are shown in the accompanying drawings.

DESCRIPTION OF THE PREFERRED EMBODIMENTS

Figure 1:
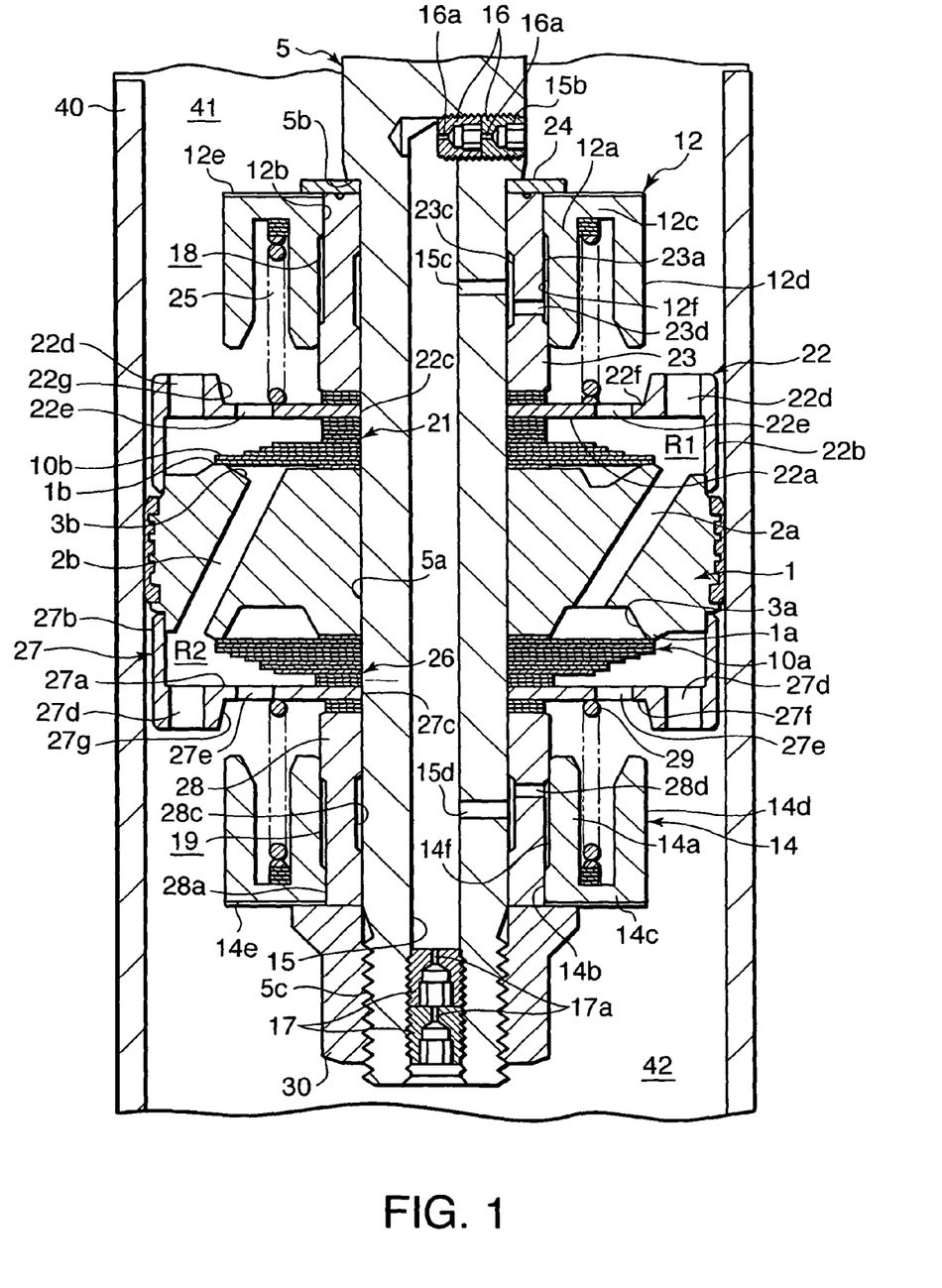
FIG. 1 is a longitudinal sectional view of essential parts of a hydraulic shock absorber showing a damping force generating mechanism according to this invention.

Referring to FIG. 1 of the drawings, a hydraulic shock absorber for a vehicle comprises a cylinder 40, a piston 1 enclosed in the cylinder 40 so as to be free to slide in an axial direction, and a piston rod 5 connected to the piston 1 and projecting axially from the cylinder 40.

The piston rod 5 has a small diameter part 5a formed at its lower end via a step 5b. The small diameter part 5a penetrates the center of the piston 1 and a piston nut 30 is screwed onto a male screw 5c formed at a lower end of the small diameter part 5a. The outer circumferential part of the piston 1 slides on the inner circumference of the cylinder 40.

The interior of the cylinder 40 is separated by the piston 1 into a first oil chamber 41 located above the piston 1 and a second oil chamber 42 located below the piston 1. Working oil is enclosed in the first oil chamber 41 and the second oil chamber 42. As a known construction of a hydraulic shock absorber, a reservoir or an air chamber to compensate for capacity variation in the cylinder 40 accompanying elongation and contraction of the piston rod 5 with respect to the cylinder 40 is provided inside or outside the cylinder 40.

First passages 2a and 2b which respectively penetrates the piston 1 obliquely, a ring groove 3a serving as an outlet of the first passage 2a, and a ring groove 3b serving as an outlet of the first passage 2b are formed in the piston 1.

An elongation damping valve 10a facing the ring groove 3a is provided under the piston 1. A contraction damping valve 10b facing the ring groove 3b is provided above the piston 1. A leaf valve comprising a stack of a plurality of leaves constitutes the elongation damping valve 10a and the contraction damping valve 10b. The elongation damping valve 10a closes the ring groove 3a by seating its outer circumferential part on a valve seat 1a formed on the piston 1 along the outer circumference of the ring groove 3a. The elongation damping valve 10b closes the ring groove 3b by seating its outer circumferential part on a valve seat 1b formed on the piston 1 along the outer circumference of the ring groove 3b.

A partitioning member 22 having an inverted cylindrical shape covers an inlet of the first passage 2a and the contraction damping valve 10b. The partitioning member 22 comprises a bottom part 22a and a tubular part 22b which extends axially downward from the outer circumference of the bottom part 22a. The small diameter part 5a of the piston rod 5 penetrates a hole part 22c formed in a center of the bottom part 22a. A tip of the tubular part 22b is fitted onto the outer circumference of the piston 1. The partitioning member 22 thus constructed forms a chamber R1 above the inlet of the first passage 2a and the contraction damping valve 10b. The bottom part 22a has a plurality of first ports 22e connecting the first oil chamber 41 and the chamber R1.

The bottom part 22a has a ring-shaped projection projecting into the first oil chamber 41 on its outer circumference. A plurality of second ports 22d connecting the first oil chamber 41 and the chamber R1 are formed through the ring-shaped projection. The ring-shaped projection is provided with a conically inclined wall face 22g on its inner circumference surrounding the first ports 22e.

A throttle 12 is provided above the partitioning member 22 so as to face the plurality of first ports 22e. The throttle 12 is fitted onto the outer circumference of a cylindrical holder 23 which is fixed onto the outer circumference of the small diameter part 5a of the piston rod 5

The throttle 12 is formed in the shape of a double tube having a bottom. The throttle 12 comprises a bottom part 12c surrounding a hole part 12b through which the small diameter part 5a of the piston rod 5 penetrates, an inner tube 12a extending downward from the inner circumference of the bottom part 12c in an axial direction along the outer circumference of the holder 23, and an outer tube 12d extending downward from the outer circumference of the bottom part 12c in the axial direction.

The throttle 12 and the partitioning member 22 are biased by a coil spring 25 so as to be detached from each other. The coil spring 25 is interposed between the bottom part 12c of the throttle 12 and the bottom part 22a of the partitioning member 22 through a space that is formed between the inner tube 12a and the outer tube 12d so as to have a ring-shaped cross section.

A ring-shaped stopper 24 is gripped between the step 5b of the piston rod 5 and the holder 23. The stopper 24, by contacting the bottom part 12c of the throttle 12, prevents the throttle 12 from displacing upward beyond a predetermined distance. In the surface of the bottom part 12c of the throttle 12 which contacts the stopper 24, radial grooves 12e are formed so as to ensure that a hydraulic pressure in the first oil chamber 41 acts on the bottom part 12c contacting the stopper 24. The bottom part 22a of the partitioning member 22 around the hole part 22c is gripped between the holder 23 and the inner circumferential part of the contraction damping valve 10b via a washer 21.

A tip of the outer tube 12d of the throttle 12 faces a valve seat 22f which is formed between the first ports 22e of the bottom part 22a of the partitioning member 22 and the conically inclined wall face 22g.

The throttle 12 displaces downward against the coil spring 25, thereby narrowing a flow sectional area between the first oil chamber 41 and the plurality of first ports 22e or shutting of the flow therebetween. Specifically, in an elongation stroke of the piston 1 during which the throttle 12 approaches the partitioning member 22, the tip of the outer tube 12d approaches the inclined wall face 22g so as to narrow the flow cross sectional area formed therebetween in relation to a flow of working oil from the first oil chamber 41 to the first passage 2a via the first ports 22e. Further, when the tip of the outer tube 12d is seated on the valve seat 22f, the flow of oil from the first oil chamber 41 to the first passage 2a via the first ports 22e is completely shut off, and the entire amount of working oil flowing from the first oil chamber 41 to the first passage 2a passes through the second ports 22d. The throttle 12 thus has a function to narrow the flow path from the first oil chamber 41 to the first passage 2a when the piston 1 strokes in the elongation direction of the shock absorber at a high speed.

A partitioning member 27 having a cylindrical shape covers an inlet of the first passage 2b and the elongation damping valve 10a. The partitioning member 27 comprises a bottom part 27a and a tubular part 27b which extends axially upward from the outer circumference of the bottom part 27a. The small diameter part 5a of the piston rod 5 penetrates a hole part 27c formed in a center of the bottom part 27a. A tip of the tubular part 27b is fitted onto the outer circumference of the piston 1. The partitioning member 27 thus constructed forms a chamber R2 under the inlet of the first passage 2b and the elongation damping valve 10a. The bottom part 27a has a plurality of first ports 27e connecting the second oil chamber 41 and the chamber R2.

The bottom part 27a has a ring-shaped projection projecting into the second oil chamber 42 on its outer circumference. A plurality of second ports 27d connecting the second oil chamber 42 and the chamber R2 are formed through the ring-shaped projection. The ring-shaped projection is provided with a conically inclined wall face 27g on its outer circumference surrounding the first ports 27e.

A throttle 14 is provided under the partitioning member 22 so as to face the plurality of first ports 27e. The throttle 14 is fitted onto the outer circumference of a cylindrical holder 28 which is fixed onto the outer circumference of the small diameter part 5a of the piston rod 5.

The throttle 14 is formed in the shape of a double tube having a bottom. The throttle 14 comprises a bottom part 14c surrounding a hole part 14b through which the small diameter part 5a of the piston rod 5 penetrates, an inner tube 14a extending upward from the inner circumference of the bottom part 14c in an axial direction along the outer circumference of the holder 28, and an outer tube 14d extending upward from the outer circumference of the bottom part 14c in the axial direction.

The throttle 14 and the partitioning member 27 are biased by a coil spring 29 so as to be detached from each other. The coil spring 29 is interposed between the bottom part 14c of the throttle 14 and the bottom part 27a of the partitioning member 27 through a space formed between the inner tube 14a and the outer tube 14d so as to have a ring-shaped cross section.

The bottom part 27a of the partitioning member 27 around the hole part 27c is gripped between the holder 28 and the inner circumferential part of the elongation damping valve 10a via a washer 26. The piston nut 30, when screwed onto the tip of the small diameter part 5a of the piston rod 5, fixedly retains the holder 28, partitioning member 27, washer 26, elongation damping valve 10a, piston 1, contraction damping valve 10b, washer 21, partitioning member 22, holder 23, and stopper 24 against the step 5b of the piston rod 5 on the outer circumference of the small diameter part 5a.

The piston nut 30 also serves as a stopper which prevents the throttle 14 from displacing downward beyond a predetermined distance. In the surface of the bottom part 14c of the throttle 14 contacting the piston nut 30, radial grooves 14e are formed to ensure that a hydraulic pressure in the second oil chamber 42 acts on the bottom part 14c contacting the piston nut 30.

A tip of the outer tube 14d of the throttle 14 faces a valve seat 27f which is formed between the first ports 27e of the bottom part 27a of the partitioning member 27 and the conically inclined wall face 27g.

The throttle 14 displaces upward against the coil spring 29, thereby narrowing a flow sectional area between the second oil chamber 42 and the plurality of first ports 27e or shutting of the flow therebetween. Specifically, in a contraction stroke of the piston 1 where the throttle 14 approaches the partitioning member 27, the tip of the outer tube 14d approaches the inclined wall face 27g so as to narrow the flow cross-sectional area formed therebetween in relation to a flow of working oil from the second oil chamber 42 to the first passage 2b via the first ports 27e. Further, when the tip of the outer tube 14d is seated on the valve seat 27f, the flow of oil from the second oil chamber 42 to the first passage 2b via the first ports 27e is completely shut off, and the entire amount of working oil flowing from the second oil chamber 42 to the first passage 2b passes through the second ports 27d. The throttle 14 thus has a function to narrow the flow path from the second oil chamber 42 to the first passage 2b when the piston 1 strokes in the contraction direction of the shock absorber at a high speed.

A second passage 15 which connects the first oil chamber 41 and the second oil chamber 42 without passing through the damping valves 10a and 10b is formed through the small diameter part 5a of the piston rod 5. An upper end of the second passage 15 is connected to the first oil chamber 41 via two orifices 16a disposed in series. A lower end of the second passage 15 is connected to the second oil chamber 42 via two orifices 17a disposed in series.

The orifice 16a is formed inside a plug 16 which is screwed into a lateral hole 15b connecting the upper end of the second passage 15 in the piston rod 5 to the first oil chamber 41. The orifice 17a is formed inside a plug 17 which is screwed into the lower end of the second passage 15 opening onto the second oil chamber 42. Although the two orifices 16a and the two orifices 17a are used in this embodiment, the number of the orifices 16a, 17a can be set differently.

The second passage 15 thus communicates with the first oil chamber 41 via the two orifices 16a, and communicates with the second oil chamber 42 via the two orifices 17a. The second passage 15 between the orifices 16a and the orifices 17a maintains a substantially constant pressure irrespective of the stroke direction or stroke speed of the piston 1.

In this hydraulic shock absorber, the pressure in the second passage 15 stabilized as described above is caused to act on the throttles 12 and 14, and therefore the coil springs 25 and 29 can be made compact and reduced in weight.

Specifically, with respect to the throttle 12, a lateral hole 15c is formed in the small diameter part 5a of the piston rod 5 so as to connect the second passage 15 to a ring groove 23c formed on the inner circumference of the holder 23. Further, a lateral hole 23d is formed in the holder 23 to connect the ring groove 23c to a pressure chamber 18 formed between the inner tube 12a of the throttle 12 and the holder 23.

The pressure chamber 18 is formed in a space having a ring-shaped cross section between an enlarged diameter part 12f on the inner circumference of the inner tube 12a of the throttle 12 and a small diameter part 23a on the outer circumference of the holder 23. An upper end of the pressure chamber 18 is delimited by the inner tube 12a of the throttle 12 and a lower end of the pressure chamber 18 is delimited by the holder 23. The pressure introduced into the pressure chamber 18 from the second passage 15 therefore exerts an upward force permanently on the throttle 12.

With respect to the throttle 14, a lateral hole 15d is formed in the small diameter part 5a of the piston rod 5 so as to connect the second passage 15 to a ring groove 28c formed on the inner circumference of the holder 28. Further, a lateral hole 28d is formed in the holder 28 to connect the ring groove 28c to a pressure chamber 19 formed between the inner tube 14a of the throttle 14 and the holder 28.

The pressure chamber 19 is formed in a space having a ring-shaped cross section between an enlarged diameter part 14f on the inner circumference of the inner tube 14a of the throttle 14 and a small diameter part 28a on the outer circumference of the holder 28. An upper part of the pressure chamber 19 is delimited by the holder 28 and a lower end of the pressure chamber 19 is delimited by the inner tube 14a of the throttle 14. The pressure introduced into the pressure chamber 19 from the second passage 15 therefore exerts a downward force permanently on the throttle 14.

In this hydraulic shock absorber, the opening pressure of the elongation damping valve 10a and the opening pressure of the contraction damping valve 10b are set in advance such that they are not reached as long as the stroke speed of the piston 1 is within a low-speed region irrespective of the stroke direction of the piston 1. Further, the spring load of the coil spring 25 and the spring load of the coil spring 29 are set in advance such that the throttle 12 and the throttle 14 do not operate before the stroke speed reaches a high-speed region. When designing the oil springs 25, their size may inevitably increase depending on the required spring loads. In this hydraulic shock absorber, the pressures in the pressure chambers 18 and 19 act on the throttles 12 and 14 in the same direction as the biasing forces of the coil springs 25, 29, respectively. The pressure chambers 18 and 19 therefore help to reduce the spring loads of the oil springs 25, 29, thereby enabling the coil springs 25 and 29 to be compact and light weight.

According to the above constructions, when the piston 1 performs an elongation stroke or a contraction stroke at a low speed, a flow of working oil is formed through the second passage 15 while the elongation damping valve 10a and the contraction damping valve 10b remain closed. Specifically, in the elongation stroke of the piston 1, working oil flows from the first oil chamber 41 to the second oil chamber 42 through the second passage 15 and generates an elongation damping force in the orifices 16a and 17a. In the contraction stroke of the piston 1, working oil flows from the second oil chamber 42 to the first oil chamber 41 through the second passage 15 and generates a contraction damping force in the orifices 16a and 17a.

When the piston 1 performs an elongation stroke or a contraction stroke at a medium speed, a differential pressure between the first oil chamber 41 and second oil chamber 42 exceeds the opening pressure of the elongation damping valve 10a or the opening pressure of the contraction damping valve 10b such that the elongation damping valve 10a or the contraction damping valve 10b opens depending on the stroke direction of the piston 1 while allowing a flow of working oil through the second passage 15.

In other words, when the piston 1 performs an elongation stroke in the medium-speed region, the elongation damping valve 10a opens so as to cause working oil in the first oil chamber 41 to flow into the second oil chamber 42 via the chamber R1, the first passage 2a, and the chamber R2 while generating an elongation damping force based on the opening pressure of the elongation damping valve 10a. When the piston 1 performs a contraction stroke in the medium-speed region, the contraction damping valve 10b opens so as to cause working oil in the second oil chamber 42 to flow into the first oil chamber 41 via the chamber R2, the first passage 2b, and the chamber R1 while generating a contraction damping force based on the opening pressure of the contraction damping valve 10b.

When the piston 1 performs an elongation stroke, or in other words the piston 1 displace upward in FIG. 1, the pressure in the first oil chamber 41 acts on the throttle 12 both upward and downward. With respect to the pressure in the first oil chamber 41, the upward pressure receiving area of the throttle 12 is smaller than the downward pressure receiving area of the same due to the pressure chamber 18. Since the pressure in the pressure chamber 18 and the biasing force of the coil spring 25 act upward on the throttle 12, the throttle 12 stays in a lifted position as shown in FIG. 1 as long as the piston 1 displaces upward in a low-speed region or a middle-speed region. However, when the piston 1 displaces upward in a high-speed region, the pressure in the first oil chamber 41 greatly increases while the pressure in the pressure chamber 18 remains constant. As a result, the downward force acting on the throttle 12 relatively increases and drives the throttle 12 downward, thereby narrowing a gap between the tip of the outer tube 12d and the inclined wall face 22g of the partitioning member 22.

As the flow path of the working oil between the first oil chamber 41 and the chamber R1 is thus narrowed, an additional elongation damping force is generated in addition to the elongation damping force generated by the elongation damping valve 10a.

The difference between the downward force and the upward force acting on the throttle 12 increases as the elongation stroke speed of the piston 1 becomes higher. Accordingly, the throttle 12 displaces further downward as the elongation stroke speed of the piston 1 becomes higher so as to narrow a gap between the tip of the outer tube 12d and the inclined wall face 22g of the partitioning member 22 further. As the flow path of the working oil between the first oil chamber 41 and the chamber R1 is thus narrowed further, the additional elongation damping force increases-further.

When the piston 1 performs a contraction stroke, or in other words the piston 1 displace downward in FIG. 1, the pressure in the second oil chamber 42 acts on the throttle 14 both upward and downward. With respect to the pressure in the second oil chamber 42, the downward pressure receiving area of the throttle 14 is smaller than the upward pressure receiving area of the same due to the pressure chamber 19. Since the pressure in the pressure chamber 19 and the biasing force of the coil spring 29 act downward on the throttle 14, the throttle 14 stays in a lifted position as shown in FIG. 1 as long as the piston 1 displaces downward in a low-speed region or a middle-speed region. However, when the piston 1 displaces downward in a high-speed region, the pressure in the second oil chamber 42 greatly increases while the pressure in the pressure chamber 19 remains constant. As a result, the upward force acting on the throttle 12 relatively increases and drives the throttle 14 upward, thereby narrowing a gap between the tip of the outer tube 14d and the inclined wall face 27g of the partitioning member 27.

As the flow path of the working oil between the first oil chamber 42 and the chamber R2 is thus narrowed, an additional contraction damping force is generated in addition to the contraction damping force generated by the elongation damping valve 10a.

The difference between the upward force and the downward force acting on the throttle 14 increases as the contraction stroke speed of the piston 1 becomes higher. Accordingly, the throttle 14 displaces further upward as the contraction stroke speed of the piston 1 becomes higher so as to narrow a gap between the tip of the outer tube 14d and the inclined wall face 27g of the partitioning member 27 further. As the flow path of the working oil between the second oil chamber 42 and the chamber R2 is thus narrowed further, the additional contraction damping force increases further.

Figure 2:
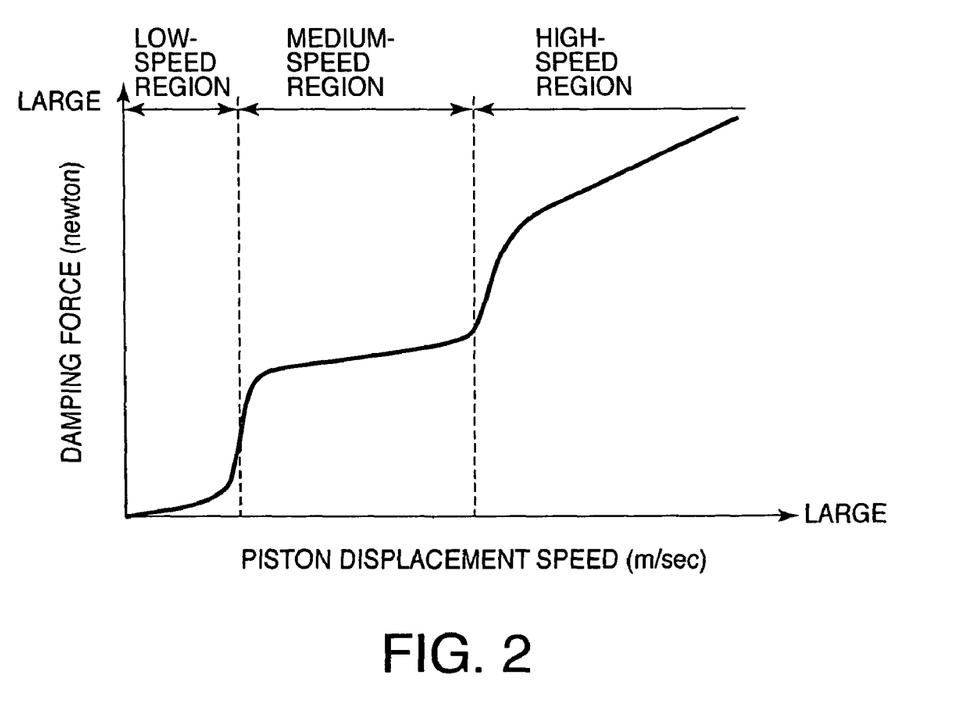
FIG. 2 is a diagram showing the characteristic of a damping force generated by the damping force generating mechanism.

Referring to FIG. 2, through the actions described above, the hydraulic shock absorber generates a small damping force when the stroke speed of the piston 1 is in a low-speed region. When the stroke speed of the piston 1 reaches a medium-speed region, the damping force generated by the orifices 16a or 17a increases rapidly, and either the elongation damping valve 10a or the contraction damping valve 10b opens depending on the stroke direction of the piston 1. When the stroke speed of the piston 1 varies within the medium-speed region, the opening of the elongation damping valve 10a or the contraction damping valve 10b varies depending on the stroke speed such that the generated damping force maintains a constant level.

When the stroke speed of the piston 1 reaches the high-speed region, the throttle 12 or 14 starts to move. As a result, in the elongation stroke, the gap between the tip of the outer tube 12d and the inclined wall face 22g of the partitioning member 22 narrows such that resistance to the flow of working oil from the first oil chamber 41 to the chamber R1 increases. However, since the tip of the outer tube 12d is arranged to be seated on the valve seat 22f after narrowing the gap with respect to the inclined wall face 22g, resistance to the flow of working oil increases gradually from the beginning of displacement of the throttle 12 in contrast to a case where the inclined wall face 22g is not provided. Accordingly, as shown in the figure, the elongation damping force in the high-speed region increases at a higher rate than in the medium-speed region with respect to an increase in the stroke speed.

In the contraction stroke, the gap between the tip of the outer tube 14d and the inclined wall face 27g of the partitioning member 27 narrows such that resistance to the flow of working oil from the second oil chamber 42 to the chamber R2 increases. However, since the tip of the outer tube 14d is arranged to be seated on the valve seat 27f after narrowing the gap with respect to the inclined wall face 27g, resistance to the flow of working oil increases gradually from the beginning of the displacement of the throttle 1r in contrast to a case where the inclined wall face 27g is not provided. Accordingly, as shown in the figure, the contraction damping force in the high-speed region increases at a higher rate than in the medium-speed region with respect to an increase in the stroke speed, as in the case of the elongation stroke.

As described above, in the hydraulic shock absorber according to this invention, the damping force does not become insufficient and a high shock absorbing performance is realized even when the piston 1 strokes at high speed.

Further, in this hydraulic shock absorber, throttles are provided to reduce the flow cross-sectional area of the working oil when the piston 1 strokes at high speed, and hence different damping force characteristics can be obtained in the medium-speed region and the high-speed region. Further, not only different damping force characteristics, but also different damping force increase rates corresponding to the stroke speed can be obtained in the medium-speed region and the high-speed region. Therefore, detailed setting of the damping force characteristics can be realized in this hydraulic shock absorber.

In the embodiment as described above, the piston stroke speed is divided into the low-speed region, the medium-speed region and the high-speed region. The stroke speed which corresponds to a boundary between the regions can be set arbitrarily. Further, it is also possible to construct a shock absorber in which the damping force characteristics vary only when the stroke speed shifts between the medium-speed region and the high-speed region while maintaining an identical damping force characteristics when the stroke speed shifts between the low-speed region and the medium-speed region.

Instead of using the coil springs 25 and 29, it is possible to bias the throttles 12 and 14 using disc springs or leaf springs. It is also possible to use biasing means other than a spring to bias the throttles 12 and 14.

The throttles 12 and 14 vary only the flow cross-sectional area to the first ports 22e and 27e and do not vary the cross-sectional area of the ports 22e and 27e. Accordingly, high operation stability is realized with respect to a case where the total flow cross-sectional area between the first oil chamber 41 and the chamber R1 is varied or a case where the total flow cross-sectional area between the second oil chamber 42 and the chamber R2 is varied.

The contents of Tokugan 2007-231470, with a filing date of Sep. 6, 2008 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiment described above, the damping forces generated in the elongation stroke and the contraction stroke of the hydraulic shock absorber are identical, but setting may be performed such that different damping forces are generated in the elongation stroke and the contraction stroke.

The valve disc is not limited to the piston 1. This invention can be applied to a base valve which is installed in the bottom of the cylinder 40.

What is claimed is:

1. A damping force generating mechanism for a shock absorber, the shock absorber comprising a first fluid chamber, a second fluid chamber, and a first passage which allows a fluid to flow between the first fluid chamber and the second fluid chamber, the damping force generating mechanism comprising:

a damping valve which generates a damping force against a fluid flow through the first passage;

a throttle for regulating an inflow cross-sectional area to the first passage according to an applied displacement pressure, the displacement pressure including a pressure in one of the fluid chambers which biases the throttle to decrease the inflow cross-sectional area and a pressure that acts on the throttle to increase the inflow cross-sectional area to the first passage depending on a velocity of the fluid flow through the throttle;

a biasing member which biases the throttle to increase the inflow cross-sectional area;

a second passage which connects the first fluid chamber and the second fluid chamber via a pair of orifices; and a pressure chamber which exerts a pressure in the second passage between the pair of orifices on the throttle to increase the inflow cross-sectional area.

2. The damping force generating mechanism as defined in claim 1, wherein the shock absorber comprises a valve disc which separates the first fluid chamber and the second fluid chamber, and the first passage is formed through the valve disc.

3. The damping force generating mechanism as defined in claim 2, wherein the shock absorber comprises a cylinder, and the valve disc is constituted by a piston which is enclosed in the cylinder so as to be free to slide axially.

4. The damping force generating mechanism as defined in claim 3, wherein the shock absorber further comprises a piston rod which is fixed to the piston and projects outside of the cylinder, and the second passage and the pair of orifices are provided inside the piston rod.

5. The damping force generating mechanism as defined in claim 4, wherein each of the pair of orifices is formed in a plug screwed into the piston rod.

6. The damping force generating mechanism as defined in claim 5, further comprising a cylindrical holder fixed onto the outer circumference of the piston rod, wherein the throttle is fitted onto the outer circumference of the holder so as to be free to slide axially and the pressure chamber is formed on the outer circumference of the holder so as to face the throttle.

7. The damping force generating mechanism as defined in claim 1, wherein the damping valve and the throttle are configured to cause the fluid to:

flow between the first fluid chamber and the second fluid chamber only through the second passage when a stroke speed of the shock absorber is in a first region;

flow between the first fluid chamber and the second fluid chamber through the first passage and the second passage when the stroke speed of the shock absorber is in a second region which is higher than the first region; and flow between the first fluid chamber and the second fluid chamber through the first passage and the second passage while causing the throttle to decrease the inflow cross-sectional area when the stroke speed of the shock absorber is in a third region which is higher than the second region.

8. The damping force generating mechanism as defined in claim 1, further comprising a first port and a second port disposed in parallel and respectively connecting the first passage and the first fluid chamber, and the throttle is arranged to close the first port according to the applied displacement pressure.

9. The damping force generating mechanism as defined in claim 1, further comprising a first port and a second port disposed in parallel and respectively connecting the first passage and the second fluid chamber, and the throttle is arranged to close the first port according to the applied displacement pressure.

10. The damping force generating mechanism as defined in claim 8, wherein the throttle is formed in a cylindrical shape, and the damping force generating mechanism further comprises a ring-shaped valve seat on which the throttle is seated and a conical inclined wall face disposed outside the valve seat, the conical inclined wall face varying a flow cross-sectional area of the inflow to the first passage according to a displacement of the throttle.

* * * * *